(No Model.)　　　　　　　J. E. DUNCAN.　　　　2 Sheets—Sheet 1.
COMPUTING SCALE.

No. 597,607.　　　　　　　　　　　Patented Jan. 18, 1898.

Witnesses　　　　　　　　　　　　　　　　　Inventor
　　　　　　By his Attorneys,　　　　　Jas. E. Duncan (No Model.)  
2 Sheets—Sheet 2.
J. E. DUNCAN.
COMPUTING SCALE.
No. 597,607.  
Patented Jan. 18, 1898.
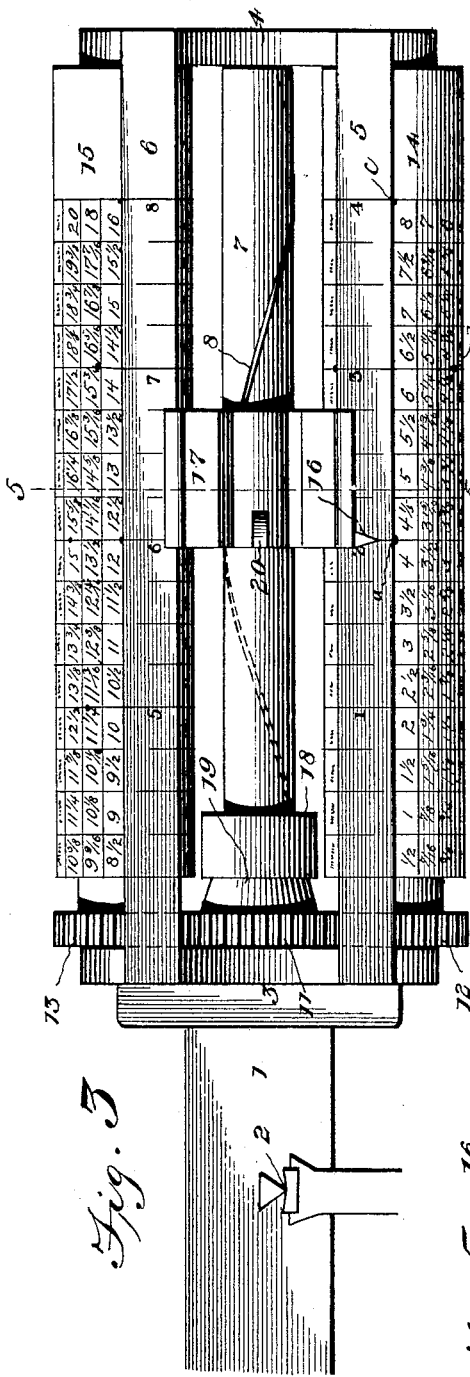
Fig. 3.
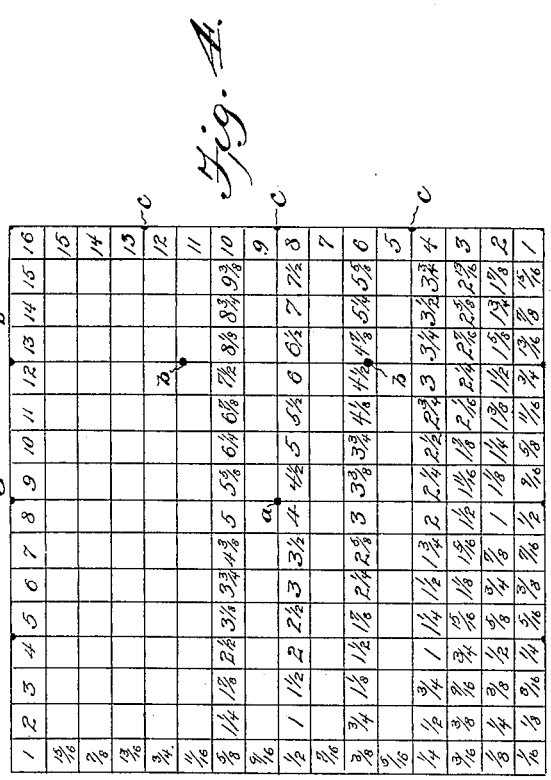
Fig. 4.
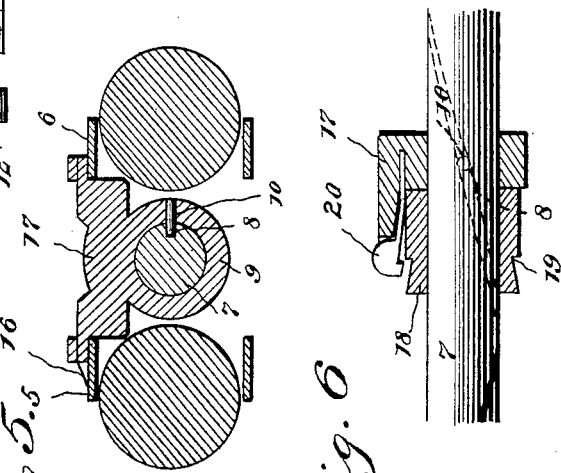
Fig. 5.  
Fig. 6.
Witnesses  
By his Attorneys,  
C. A. Snow & Co.
Inventor  
Jas. E. Duncan

UNITED STATES PATENT OFFICE.

JAMES EUGENE DUNCAN, OF CENTRALIA, WISCONSIN.

COMPUTING-SCALE.

SPECIFICATION forming part of Letters Patent No. 597,607, dated January 18, 1898.

Application filed May 26, 1897. Serial No. 638,297. (No model.)

*To all whom it may concern:*

Be it known that I, JAMES EUGENE DUNCAN, a citizen of the United States, residing at Centralia, in the county of Wood and State of Wisconsin, have invented a new and useful Computing-Scale, of which the following is a specification.

My invention relates to computing-scales, the computing mechanism being adapted for use in connection with that class of scales wherein beams are employed; and the object in view is to provide a simple and compact construction and arrangement of parts whereby an extended range of rate marks or characters and relative-value indicators may be employed.

Further objects and advantages of this invention will appear in the following description, and the novel features thereof will be particularly pointed out in the appended claims.

Figure 1:
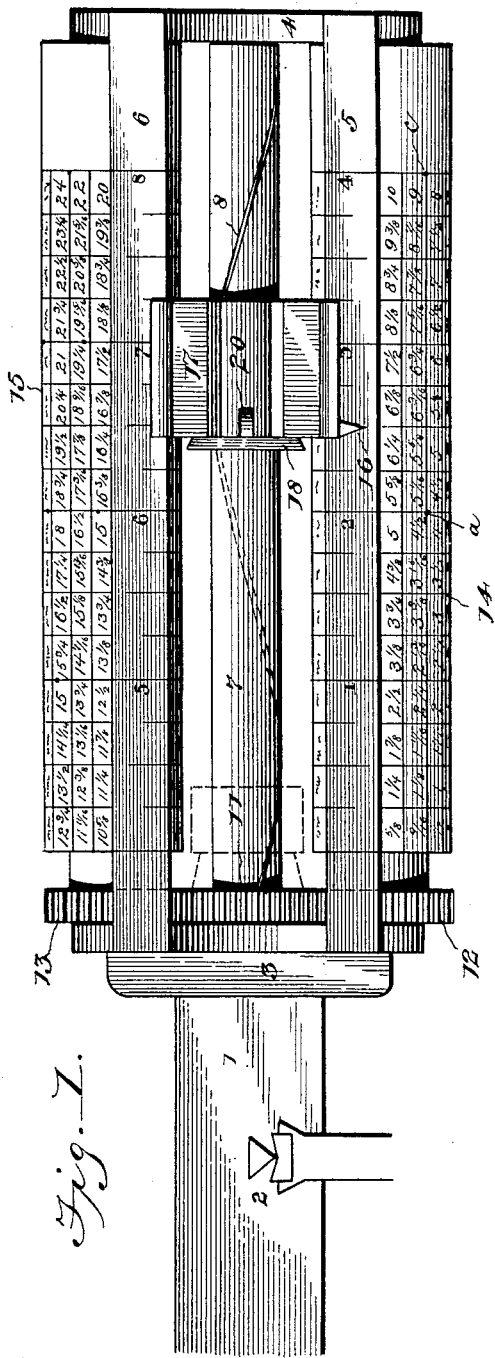
Figure 2:
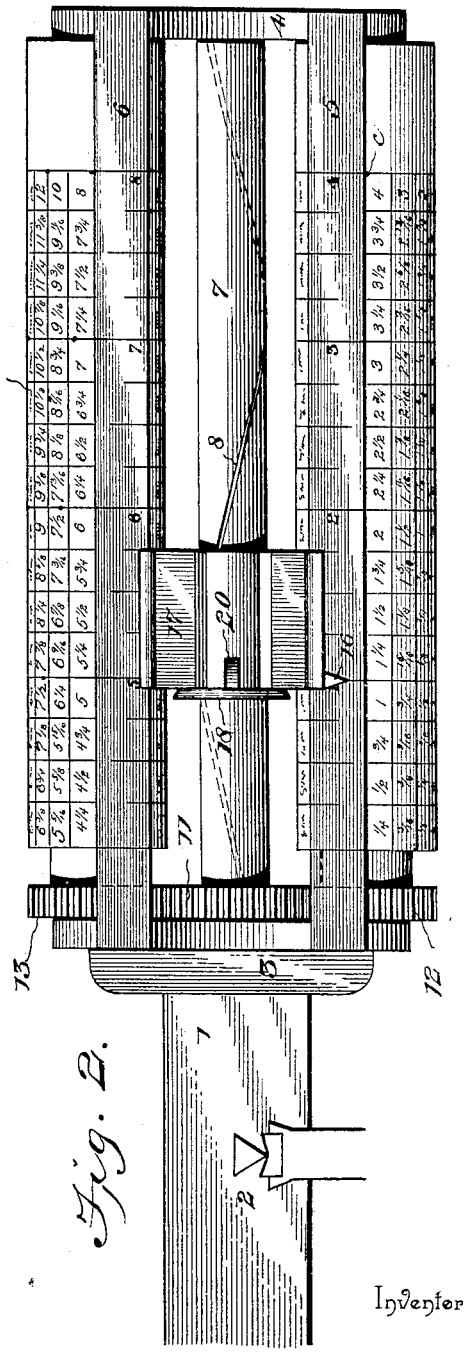

In the drawings, Figure 1 is a view of a scale-beam computing apparatus constructed in accordance with my invention. Fig. 2 is a similar view showing a different arrangement of the poise. Fig. 3 is a similar view showing the arrangement of parts when the apparatus is used to determine the quantity or weight of a given substance or article of merchandise when the rate per unit of weight and the value for the amount desired are known. Fig. 4 is a diagram showing the superficial divisions and characters of one of the value-indicating devices. Fig. 5 is a transverse vertical section of the computing apparatus on the line 5 5 of Fig. 3. Fig. 6 is a detail longitudinal section of the poise and the contiguous portion of the feed-screw.

Similar numerals of reference indicate corresponding parts in all the figures of the drawings.

In the drawings I have shown one embodiment of my invention wherein for convenience of illustration the weight-indicating devices are of sufficient extent to weigh only four pounds, while the rate-indicating devices extend to eight cents per unit of weight; and, furthermore, for the purposes of illustration I have deemed it sufficient to show only two value-indicating devices, with the means for communicating simultaneous motion thereto from the poise which carries a pointer to traverse the weight-indicator; but it will be understood that the scope and number of the indicators may be extended upon the lines disclosed in the drawings and in the following description and that various other changes in the form, proportion, and the minor details of construction may be resorted to without departing from the spirit or sacrificing any of the advantages of this invention.

Referring to the drawings, 1 designates a scale-beam fulcrumed at 2 and carrying by means of suitable terminal brackets 3 and 4 a plurality of parallel rate-indicators 5 and 6, consisting of bars divided linearly to form units of rate or price per unit of weight or quantity, each main or unit division being subdivided to form fractional rate divisions. In the construction illustrated the lower or main rate-bar 5 is divided to form unit divisions numbered consecutively from "1" to "4," while the auxiliary rate-indicating bar 6, which is preferably arranged above the main rate-indicating bar, is divided to form an equal number of divisions numbered in continuation of the series on the main or lower rate-bar, or from "5" to "8," inclusive, the several divisions or graduations of the auxiliary rate-bar being arranged, respectively, above the divisions or graduations of the main rate-bar. Furthermore, the main divisions of the auxiliary rate-bar are subdivided to correspond with the subdivisions of the main rate-bar. In the drawings each main division is divided into four equal parts to represent halves and quarters of the unit adopted as the unit of rate. Assuming that the unit of rate is one cent, it will be seen that the graduations of the lower or main rate-bar range from one-fourth of a cent to four cents, while the graduations of the auxiliary bar illustrated range from four and one-fourth to eight cents. The main rate-bar is also designed to form the additional function of a weight-indicator traversed by a poise, which is held in place by means of a feed-screw 7, said screw being provided with a spiral groove 8, which makes one complete circuit of the screw while traversing the same longitudinally from a point opposite one end of the graduations of the rate-bars to the other end of the graduations of said bars. The ring or slide 9 of the poise is provided with a feather or pin 10, which engages the groove 8, whereby as the poise is moved longitudinally or parallel with the rate-bars rotary motion is imparted to the feed-screw and said feed-screw by reason of the above-mentioned specific arrangement of the groove makes one complete revolution while the poise traverses the main rate-bar from one end of its graduated portion to the other. The feed-screw is journaled in the terminal brackets 3 and 4 and at one end carries a gear 11, which meshes with corresponding gears 12 and 13 on value-indicating devices 14 and 15, also journaled in said terminal brackets, these value-indicating devices being arranged, respectively, contiguous to the rate-bars and axially parallel therewith, with the front lines of their surfaces contiguous to the indicating edges of the rate-bars, the indicating edge of the lower bar being its lower edge while the indicating edge of the upper bar is its upper edge. Hence as the poise is moved parallel with the rate-bars and communicates rotary motion to the feed-screw a corresponding rotary motion is imparted to both of the value-indicators, whereby all points of the circumference of each roll or cylinder (in which form the value-indicators are constructed) are brought under the indicating edge of the contiguous rate-bar.

In Fig. 4 I have shown a diagram illustrating the system of graduating the surfaces of the value-indicators, and referring thereto it will be seen that it is superficially divided by longitudinal and transverse lines to form spaces containing the graduations representing values. The transverse columns register, respectively, with the graduations of the rate-bar, while the longitudinal columns are adapted to be brought successively into contiguity with the indicating edge of the rate-bar. Inasmuch as the unit-divisions of the rate-bars are divided into quarters, the lowest graduation on the value-indicator must be one-sixteenth, or the square of one-fourth, for the reason that it must indicate the value of one-fourth of a pound of an article worth one-fourth of a cent a pound. Progressing from this initial point in the transverse column which operates in the plane of the first subdivision of the rate-bar, the graduations must increase successively by the value of the first graduation, or one-sixteenth, for each step. Hence observe that in the first column on the lower value-indicator 14 (which is the one illustrated in Fig. 4) the graduations will read "$\frac{1}{16}$," "$\frac{1}{8}$," "$\frac{3}{16}$," "$\frac{1}{4}$," and so on continuously to "1." Obviously the maximum value-character in this column will be one-fourth of the maximum rate-character on the lower or main rate-bar 5. The remaining transverse columns of the value-indicator—namely, those arranged, respectively, in registration with the several divisions of the rate-bars—have their characters arranged to increase according to the number found in the longitudinal column of the initial graduation. For instance, in the transverse column of which "$\frac{1}{8}$" forms the initial character the values increase at each step by one-eighth, as one-eighth, one-fourth, three-eighths, one-half, &c. In the transverse column of which "$\frac{3}{16}$" forms the initial character the values increase by three-sixteenths at each step, as three-sixteenths, three-eighths, nine-sixteenths, three-fourths, &c. In the transverse column of which "$\frac{3}{4}$" is the initial character the values increase by three-fourths at each step, as three-fourths, one and one-half, two and one-fourth, &c., and in the transverse column of which "1" forms the initial character the values increase by one at each step, as one, two, three, &c. This progression brings the character "16" in the terminal or maximum space in the transverse column which is in registration with the terminal division "4" of the main rate-bar 5, whereby the value (or sixteen cents) of four pounds of an article of which the rate is four cents a pound may be indicated. The system of graduation as above indicated is carried out on the auxiliary value-indicator and may be extended to additional auxiliary indicators to the desired number.

With the parts constructed as above described it will be understood that one complete revolution of each value-indicator is caused during the movement of the poise from its initial or innermost to its terminal or outermost point on the main rate-bar, which constitutes the weight-indicator, and that when the poise is located at any given main or sub division of the main rate-bar the several values of articles of the weight indicated by the poise and at rates ranging from one-fourth of a cent per pound to eight cents per pound will be exposed contiguous to the indicating edges of the rate-bars and in registration, respectively, with those graduations of the rate-bars which indicate the several rates. For instance, referring to Fig. 2, wherein the poise is located to indicate one pound in weight, it will be seen that in the column corresponding with column "1" of the rate-bar 5 is found the value-character "1," thus indicating that one pound of an article worth one cent per pound is one cent. If the value of the article is three cents per pound, the numeral "3" will be found in the column on the value-indicator or computing-cylinder in alinement with the rate-character "3" of the rate-bar 5. If the value of the article is four and one-half cents per pound, the value-character "$4\frac{1}{2}$" will be found in the column "$4\frac{1}{2}$" of the rate-bar 6. In the same way if the poise is arranged to indicate two and one-half pounds, as shown in Fig. 1, the value of two and one-half pounds of an article worth two and one-half cents per pound will be found on the computing-cylinder in the column registering with the column "$2\frac{1}{2}$" of the rate-bar 5, or six and one-fourth. If the value of the article is seven and one-half cents a pound, the value of two and one-half pounds thereof will be found in the column of the computing-cylinder 15 which is arranged in registration with the column "$7\frac{1}{2}$" of the rate-bar 6, or eighteen and three-fourths.

It will be understood that for each movement of the poise through a distance corresponding with one graduation, or one-fourth of a unit of the rate-indicators, the computing-cylinders rotate sufficiently to bring the succeeding longitudinal columns of value-characters contiguous to the indicating edges of the rate-bars. For instance, assuming that the poise is in the position shown in Fig. 2, with its pointer 16 on the graduation "1" of the rate-bar, the movement of said poise to the succeeding graduation-subdivision "¼" of the rate-bar will turn the computing-cylinder 14 to bring the succeeding longitudinal column in place of the one shown in Fig. 2, whereby the lowest graduation of the then exposed longitudinal column will be "$\frac{3}{16}$," and hence the graduation "¾" will be in registration with the column "1" of the rate-bar 5 and the graduation "3" of the computing-cylinder will be in registration with the column "4" of said rate-bar.

The poise which I prefer to employ in connection with the computing mechanism above described is of sectional construction, the body portion 17 thereof carrying the pointer 16 and the auxiliary detachable member 18 being fitted to slide upon the feed-screw and being constructed for engagement by locking devices, whereby the two members may be secured together for simultaneous movement with the axis of the feed-screw. In the construction illustrated the auxiliary or detachable member is provided with an annular groove 19 for engagement by a catch 20, mounted upon the main or body portion of the poise and adapted to be depressed terminally by the operator during the movement of the poise from one point to another when it is desired to move both members simultaneously. When it is desired to move the main or body portion of the poise independently of the auxiliary or detachable portion, the catch is allowed to remain out of engagement with the auxiliary member by avoiding the application of pressure thereto.

When the main member of the poise is used independently of the auxiliary or detachable member, the latter being left in the initial position contiguous to the inner ends of the rate-bars, as shown in Fig. 3, the movement of the main member from its initial point to the outer ends of the rate-bars is adapted to indicate a weight of one pound, and hence the movement thereof for a distance equal to one-half the length of the rate-bars will indicate a weight of one-half pound.

Inasmuch as the computing-cylinders make one complete revolution for each movement of the poise through a distance equal to the length of the graduated portions of the rate-bars it is obvious that any movement of the poise through a less distance will be accompanied by a corresponding and proportionate rotation of the computing-cylinders. I utilize this fact in adapting the mechanism for indicating the weight of an article of which the rate per pound and the value are known— as, for instance, when so many cents' worth of a given article of which the rate is so much per pound. To accomplish this, each computing-cylinder is divided circumferentially in the planes, respectively, of the graduations on the rate-bars to form a number of divisions corresponding with the character in the registering column of each rate-bar. For instance, the cylinder 14 is divided in the plane of the column containing the graduation "2" of the rate-bar to form diametrically opposite points or dots $a$, (see Fig. 4,) while in the plane of the graduation "3" the cylinder is divided circumferentially into thirds, (indicated by the points or dots $b$,) while in the plane of the column "4" of the rate-bar the surface of the cylinder is divided into fourths, (indicated by the points or dots $c$.) Hence with both members of the poise in their initial position (indicated in dotted lines in Fig. 1) the movement of the main member 17 to the point indicated in full lines in Fig. 3 or to the column "2" of the rate-bar will cause the cylinders to make a one-half revolution and thus bring the dot arranged in the plane of said graduation to a point under the indicating edge of the rate-bar 5. Suppose, therefore, that a customer asks for one cent's worth of an article sold at two cents per pound. The movement of the main member of the poise until the point or dot $a$ is in the plane of the rate-bar edge will indicate the position which the poise member must occupy in order to weigh one cent's worth of said article sold at two cents per pound. If the demand is for one cent's worth of an article worth four cents a pound, the poise is moved, as above indicated, until the first point or dot $c$ in the column "4" of the rate-bar comes under the indicating edge of said rate-bar, and in the same way if one cent's worth of an article worth eight cents per pound is demanded the poise should be moved from its initial position toward the outer end of the rate-bars until the first point or dot on the computing-cylinder 15 in the plane of the rate-character "8" comes under the edge of the rate-bar 6. The movement of the poise is checked when the desired point or dot of the computing-cylinder is brought under the indicating edge of the rate-bar and thus indicates the desired weight. With the poise in the position indicated in Fig. 3 it will be seen that the points or dots in the columns "2," "4," "6," and "8" are under the indicating edges of the rate-bars; but while the poise is moved from its initial position to that indicated in Fig. 3 two points or dots in the column registering with the column "4" of the rate-bar 5 have passed under the indicating edge of said rate-bar, three points or dots in the column "6" have passed under the indicating edge of the rate-bar 6, and four points or dots in the column "8" have passed under the indicating edge of said bar. Hence the position of the poise in Fig. 3 indicates the weight of one cent's worth of an article worth two cents per pound, two cents' worth of an article worth four cents per pound, three cents' worth of an article worth six cents per pound, and four cents' worth of an article worth eight cents per pound.

The advantage of the double arrangement of cylinders or the duplication of the same resides in the fact that with a scale-beam of a given length a greater number of rate-graduations may be employed, and hence articles having a greater range of prices can be read thereon without losing the advantages of the price-computing means. In other words, with a single cylinder of the range illustrated in the drawings the highest rate per pound which can be computed is four cents, whereas by doubling the computing-cylinder, without increasing the length of the scale-beam, articles ranging in price up to eight cents per pound can be read, and, furthermore, this duplication of the computing-cylinder is accomplished without materially complicating the construction of the device, owing to the fact that one of the rate-indicators is utilized as a weight-indicator, thus dispensing with an auxiliary or special weight-indicator. The disadvantage of employing a long scale-beam is that as the poise is moved toward the outer end of the beam or from the pivot the graduations will necessarily be placed so close together as to render the operation of the apparatus difficult. By shortening the scale-beam and employing a plurality of computing-cylinders and rate-bars this disadvantage of reducing the distances between the graduations is overcome, and the disadvantage of reducing the intervals between the graduations is of special advantage when the device is constructed to weigh articles of which the rate is expressed in the fractional parts of a unit, as two and one-fourth, three and one-half, one and three-fourths, &c., cents per pound.

Having described my invention, what I claim is—

1. The combination with a scale-beam, of a computating-cylinder, superficially provided with circumferential columns of value-characters, a rate-indicator arranged contiguous to the cylinder and provided with columns registering with those on the cylinder, and having characters indicating rates per unit of weight, a poise traversing said rate-indicator and referring to the graduations thereof to indicate weights, and connections between the poise and cylinder, whereby rotary motion is imparted to the latter, substantially as specified.

2. The combination with a scale-beam, of a computing-cylinder, superficially provided with circumferential columns of value-characters, a rate-indicator arranged contiguous to the cylinder and provided with columns registering with those on the cylinder, and having characters indicating rates per unit of weight, said cylinder being circumferentially divided, in the planes of the columns of the rate-bar, into a number of divisions corresponding respectively with the characters designating said columns of the rate-bar, a sectional poise traversing a weight-indicator, and capable of movement either in whole or in part, and operating connections between one member of the poise and the cylinder, for imparting rotary motion to the latter, substantially as specified.

3. The combination with a scale-beam, of a computing-cylinder, superficially provided with circumferential columns of value-characters, a rate-indicator arranged contiguous to the cylinder and provided with columns registering with those on the cylinder, and having characters indicating rates per unit of weight, said cylinder being circumferentially divided, in the planes of the columns of the rate-bar, into a number of divisions corresponding respectively with the characters designating said columns of the rate-bar, a sectional poise traversing a weight-indicator, and comprising main and auxiliary members, of which the former is capable of movement independently of the latter, a locking device for securing the poise members together, and operating connections between the main poise member and the cylinder, substantially as specified.

4. The combination with a scale-beam, of a computing-cylinder, superficially provided with circumferential columns of value-characters, a rate-indicator arranged contiguous to the cylinder and provided with columns registering with those on the cylinder, and having characters indicating rates per unit of weight, said cylinder being circumferentially divided, in the planes of the columns of the rate-bar, into a number of divisions corresponding respectively with the characters designating said columns of the rate-bar, a sectional poise traversing a weight-indicator, and comprising main and auxiliary members, of which the former is movable independently of, and is recessed to receive, the latter, a yielding catch on the main member to engage a depression in the auxiliary member, and normally held out of engagement therewith, and operating connections between the main poise member and the cylinder, substantially as specified.

In testimony that I claim the foregoing as my own I have hereto affixed my signature in the presence of two witnesses.

JAMES EUGENE DUNCAN.

Witnesses:
WILLIAM A. PERSO,
JAMES W. NATWICK.